3,124,552
PROCESS OF POLYMERIZING COMPOUNDS POSSESSING A POLYMERIZABLE DOUBLE BOND
Robert Tirtiaux, Notre-Dame-de-Gravenchon, and Roger Tourret, Bolbec, France, assignors to Esso Research and Engineering Company, a corporation of Delaware
No Drawing. Filed June 16, 1959, Ser. No. 820,580
Claims priority, application France Sept. 3, 1958
5 Claims. (Cl. 260—45.5)

The present invention concerns an improved process for preparing copolymers and the use of such copolymers as additives for lubricating oils.

The invention consists in a process for preparing copolymers of vinyl compounds with copolymerizable esters which comprises adding to the monomers before the polymerization, a thickening aid which is a polymer or copolymer of an olefin or unsaturated ester or a mixture of such polymers and/or copolymers.

The use of such a thickening aid assists the copolymerization reaction and lessens both the initiation period before polymerization commences, and the time taken to obtain total polymerization. Further, the reaction proceeds more smoothly and oil-soluble products may be easily obtained, which products, when added to lubricating oils, act as viscosity index improvers and as detergents. Thus the invention also consists in a lubricating composition comprising a lubricating oil and one or more copolymers prepared as described above.

The vinyl compound is preferably a vinyl ester, e.g. an ester of vinyl alcohol with a $C_1$ to $C_6$ fatty acids; vinyl acetate is particularly preferred. The copolymerizable ester may be an ester of an $\alpha,\beta$ unsaturated dicarboxylic acid, e.g. maleic and fumaric acids. Alkyl fumarates, especially $C_8$–$C_{18}$ alkyl fumarates, such as Lorol fumarates, are particularly preferred. "Lorol" is a registered trademark for a mixture of saturated aliphatic alcohols of from 8 to 18 carbon atoms obtained by the hydrogenation of coconut oil. These and other alcohols that are derived from naturally occurring esters are referred to in this specification as natural alcohols. Alternatively, the copolymerizable ester may be an ester of an unsaturated monocarboxylic acid. The copolymerizable esters may contain substituent groups, for example they may be derived from alkoxylated acids or alkoxylated alcohols.

Preferred thickening aids are polyolefins, especially those of molecular weight 500–300,000, such as polypropylenes, polybutenes and polyisobutenes, e.g. polyisobutene having a molecular weight of 1100; polyesters such as polymerized alkyl methacrylates and polyacrylates preferably having 4 to 30 carbon atoms in the alkyl group, the preferred molecular weight of the polyesters being 500–2,000,000, especially 500–300,000; and copolymers of copolymerizable organic compounds and esters of aliphatic alcohols having, for example, 3 to 20 carbon atoms and unsaturated mono- or dicarboxylic organic acids, which esters may contain substituent groups, e.g. alkoxy groups; such copolymers may be obtained for example, by copolymerizing vinyl compounds; and alkyl fumarates. The viscosity of the thickening aid at 99° C. is preferably between 215 and 21,500 cs. The thickening aids may, if desired, be dissolved in oil.

The quantity of thickening aid used may be 10 to 50%, preferably 20 to 40% by weight based on the total weight of the reactants to be polymerized.

The polymerization may be carried out in a conventional manner, for example using heat and pressure, with or without a catalyst. Catalysts such as peroxides, oxygen, $BF_3$ and $AlCl_3$ may be used, but the preferred catalyst is benzoyl peroxide. The polymerization reaction may be performed as follows: the thickening aid is added to the reactants to be polymerized at the same time as the catalyst, and the reaction is continued at a temperature of 50 to 110° C. for the time necessary to obtain the desired degree of polymerization. The reaction mixture is then diluted with an oil which may be, for example, a paraffinic, naphthenic or synthetic oil.

The copolymers prepared according to the process of the present invention may be used as additives for lubricating oils, which oils may be mineral or synthetic oils. From 0.1 to 20%, preferably 0.5 to 4% by weight of the copolymers, may be dissolved in the lubricating oil.

The following example illustrates the present invention.

EXAMPLE

Vinyl acetate was copolymerized with various fumarates in the presence of 0.4% benzoyl peroxide at a temperature of 75° C. Polymerization was carried out both with and without the addition of thickening aids to the monomers to be polymerized and it was found that the polymerization reaction is aided by the thickening agent, in that both the initiation period before polymerization commences and the total polymerization time are decreased.

The thickening aids used were:
(1) Polyisobutylene of molecular weight 1100.
(2) A polyfumarate obtained by copolymerizing a mixture of the following for 5 hours in the presence of 0.4% benzoyl peroxide:

|  | G. |
|---|---|
| (a) Vinyl acetate | 80 |
| (b) Fumarate of natural $C_{10-18}$ alcohols | 100 |
| (c) White oil of viscosity 3.3 cs. at 99° C | 400 |

A 33% solution in paraffin oil of the polyfumarate thus obtained has a viscosity of 1075 cs. at 99° C. (The paraffin oil has a viscosity of 5.3 cs. at 99° C. and a V.I., or viscosity index of 112.)

Table I shows the results obtained in these copolymerizations:

Table I

|  | Copolymers Obtained | | | | | | |
|---|---|---|---|---|---|---|---|
|  | A2 | B2 | A3 | B3 | B'3 | A4 | B4 |
| Composition of the initial charge (weights in grams): | | | | | | | |
| Vinyl acetate | 80 | 80 | 40 | 40 | 40 | 40 | 40 |
| Fumarate of natural $C_{8-18}$ alcohols | | | | | | | |
| Fumarate of natural $C_{8-10}$ alcohols | 100 | 100 | 50 | 50 | 50 | 50 | 50 |
| Fumarate of $C_{16-18}$ alcohol | 20 | 20 | 10 | 10 | 10 | 10 | 10 |
| White oil (viscosity 3.3 centistokes at 99° C.) | 20 | 20 | 20 | | | | |
| Paraffin oil (viscosity 5.3 centistokes at 99° C.) | | | | | | 20 | 20 |
| Thickening aid: | | | | | | | |
| Polyfumarate | | 50 | | | | | 20 |
| Polyisobutylene of molecular weight 1100 | | | | 25 | 25 | | |
| Characteristics of the reaction: | | | | | | | |
| Time of period of initiation in hours | 1.5 | 0.25 | 2 | 0.5 | 1 | (1) | 1 |
| Time of polymerization in hours | 5 | 2 | 5 | 3.5 | 4 | (1) | 4 |
| Diluent: | | | | | | | |
| Paraffin oil of viscosity 5.3 centistokes at 99° C | 285 | 235 | 122 | 115 | 127 | (1) | ---- |
| Viscosity of a 33% solution of copolymer in above paraffin oil in centistokes at 99° C | 1,376 | 1,380 | 838 | 598 | 1,840 | (1) | ---- |

[1] No polymerization.

The copolymers obtained as described above were added to a paraffin oil having a viscosity index of 112 and a viscosity of 5.3 cs. at 99° C. and it was found that the copolymers prepared according to the present invention are just as efficient as oil viscosity index improvers as the copolymers obtained by the conventional polymerization reactions. The viscosities and viscosity indices of the oil solutions are set out in Table II.

*Table II*

| Percent copolymer in a Paraffin Oil (percent expressed as active matter) | Characteristics of oil according to the nature and quantity of the copolymer added—Viscosity Index | | | | | |
|---|---|---|---|---|---|---|
| | A2 | B2 | A3 | B3 | B'3 | B4 |
| 0 | 112 | 112 | 112 | 112 | 112 | 112 |
| 0.5 | 133.5 | 133.5 | 133 | 129 | 131 | 133 |
| 1 | 145 | 145 | 140 | 139 | 142.5 | 140 |
| 2 | 154 | 154 | 152.5 | 149 | 152 | 152.5 |
| 4 | 152 | 152 | 151.5 | 153 | 155 | 151.5 |
| | Viscosity at 99° C. in centistokes | | | | | |
| 0 | 5.3 | 5.3 | 5.3 | 5.3 | 5.3 | 5.3 |
| 0.5 | 6.6 | 6.6 | 6.6 | 6.3 | 6.4 | 6.5 |
| 1 | 7.9 | 8 | 7.8 | 7.2 | 7.7 | 7.7 |
| 2 | 10.3 | 11.3 | 11.3 | 9.4 | 10.9 | 10.5 |
| 4 | 14.3 | 14 | 22.4 | 15.8 | 21.6 | 20 |

What is claimed is:

1. A process for preparing an oil-soluble viscosity-index-improving copolymer of a vinyl alcohol ester of a $C_1$ to $C_6$ fatty acid with a copolymerizable ester of an alpha, beta ethylenically unsaturated dicarboxylic acid and a $C_8$ to $C_{18}$ aliphatic alcohol which comprises adding to the monomers prior to copolymerization from 10 to 50 weight percent, based on the total weight of reactants to be polymerized, of a thickening aid selected from the group consisting of polypropylenes, polybutenes, polyisobutenes, polymerized alkyl acrylates containing 4 to 30 carbon atoms in the alkyl group, polymerized alkyl methacrylates containing 4 to 30 carbon atoms in the alkyl group, and copolymers of vinyl alcohol esters and alkyl fumarates, said thickening aid having a viscosity in the range of about 215 to about 21,500 centistokes at 99° C., and thereafter polymerizing the mixture at a temperature in the range of 50 to 110° C.

2. Process as defined by claim 1 wherein said vinyl alcohol ester in said oil-soluble copolymer is vinyl acetate.

3. Process as defined by claim 1 wherein said copolymerizable ester is an alkyl fumarate.

4. Process as defined by claim 1 wherein said thickening aid is polyisobutylene.

5. Process as defined by claim 1 wherein said thickening aid is a copolymer of vinyl acetate and a $C_{10}$–$C_{18}$ alkyl fumarate.

References Cited in the file of this patent
UNITED STATES PATENTS

| | | |
|---|---|---|
| 2,410,089 | Lundquist et al. | Oct. 29, 1946 |
| 2,430,564 | Gordon | Nov. 11, 1947 |
| 2,483,960 | Baer | Oct. 4, 1949 |
| 2,485,796 | White | Oct. 25, 1949 |
| 2,486,839 | Gordon | Nov. 1, 1949 |
| 2,512,697 | Te Grotenhuis | June 27, 1950 |
| 2,609,353 | Rubens et al. | Sept. 2, 1952 |
| 2,677,662 | Mikeska | May 4, 1954 |
| 2,704,277 | Giammaria | Mar. 15, 1955 |
| 2,825,717 | Cashman et al. | Mar. 4, 1958 |
| 2,906,729 | Popkin | Sept. 29, 1959 |
| 2,936,300 | Tutwiler et al. | May 10, 1960 |
| 2,992,203 | Protzman | July 11, 1961 |